(No Model.)  4 Sheets—Sheet 1.

G. HILL.
VALVE CONTROLLER.

No. 547,434. Patented Oct. 8, 1895.

WITNESSES:
Edmund A. Strauss.
Geo. E. Morse.

INVENTOR
George Hill,
BY Briesen & Knauth
his ATTORNEYS.

(No Model.) 4 Sheets—Sheet 4.

G. HILL.
VALVE CONTROLLER.

No. 547,434. Patented Oct. 8, 1895.

WITNESSES:
Edmund A. Strause
Charles E. Smith

INVENTOR
George Hill,
BY Briesen & Knauth
his ATTORNEYS

UNITED STATES PATENT OFFICE.

GEORGE HILL, OF NEW BRUNSWICK, NEW JERSEY.

VALVE-CONTROLLER.

SPECIFICATION forming part of Letters Patent No. 547,434, dated October 8, 1895.

Application filed January 3, 1895. Serial No. 533,697. (No model.)

*To all whom it may concern:*

Be it known that I, GEORGE HILL, a resident of New Brunswick, Middlesex county, State of New Jersey, have invented certain new and useful Improvements in Valve-Controllers, of which the following is a specification.

My invention relates to valve-controllers, and has for its object to produce an efficiently-operating electromechanical system and device for opening and closing valves and the like.

To this end my invention consists in the construction and arrangement hereinafter set forth and claimed.

My invention will be understood by reference to the accompanying drawings, in which—

Figure 1:
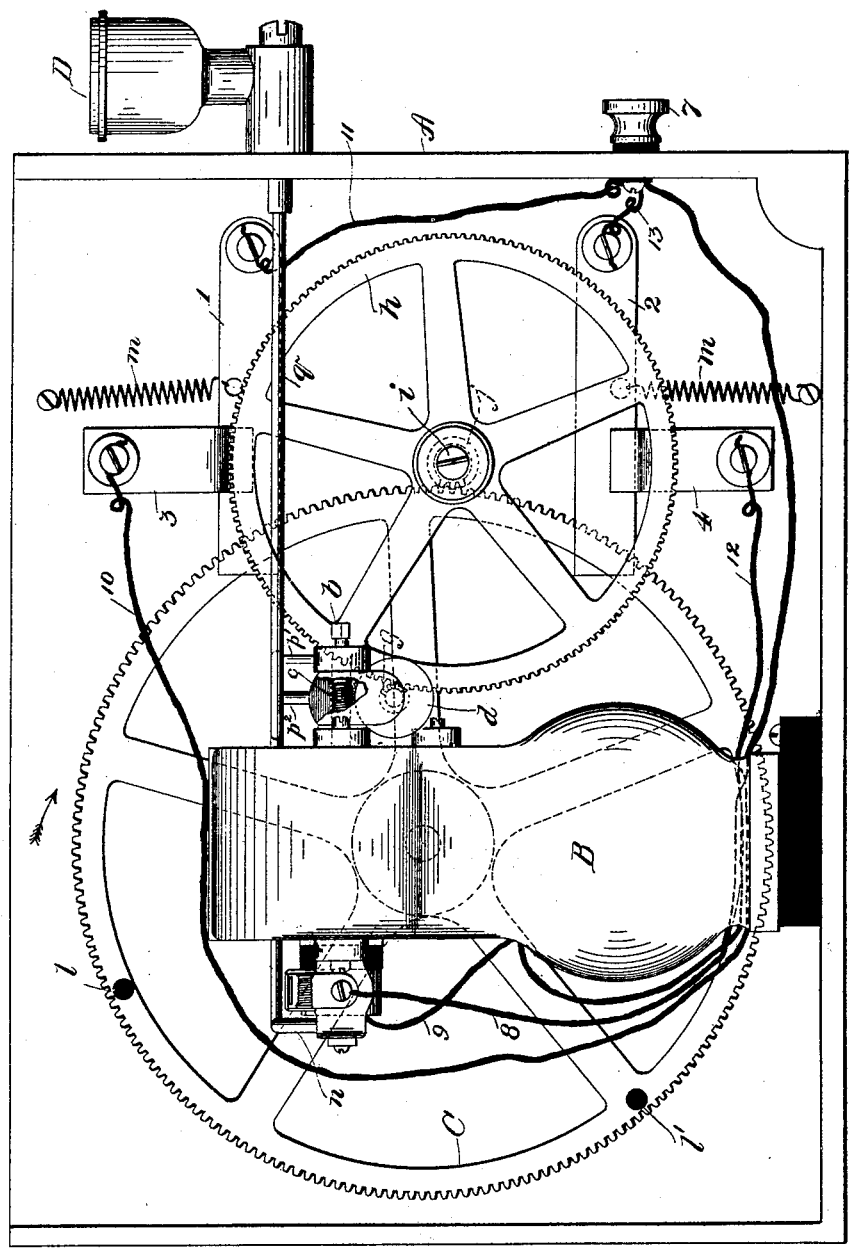
Figure 2:
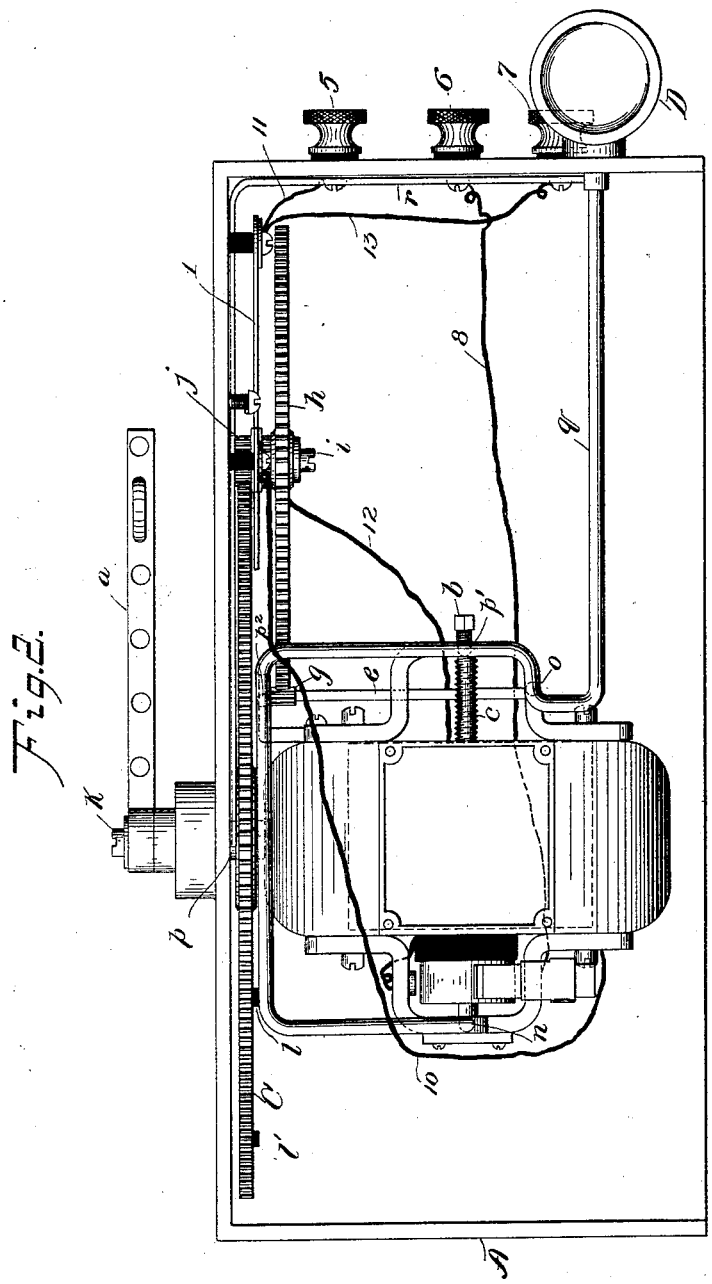
Figure 3:
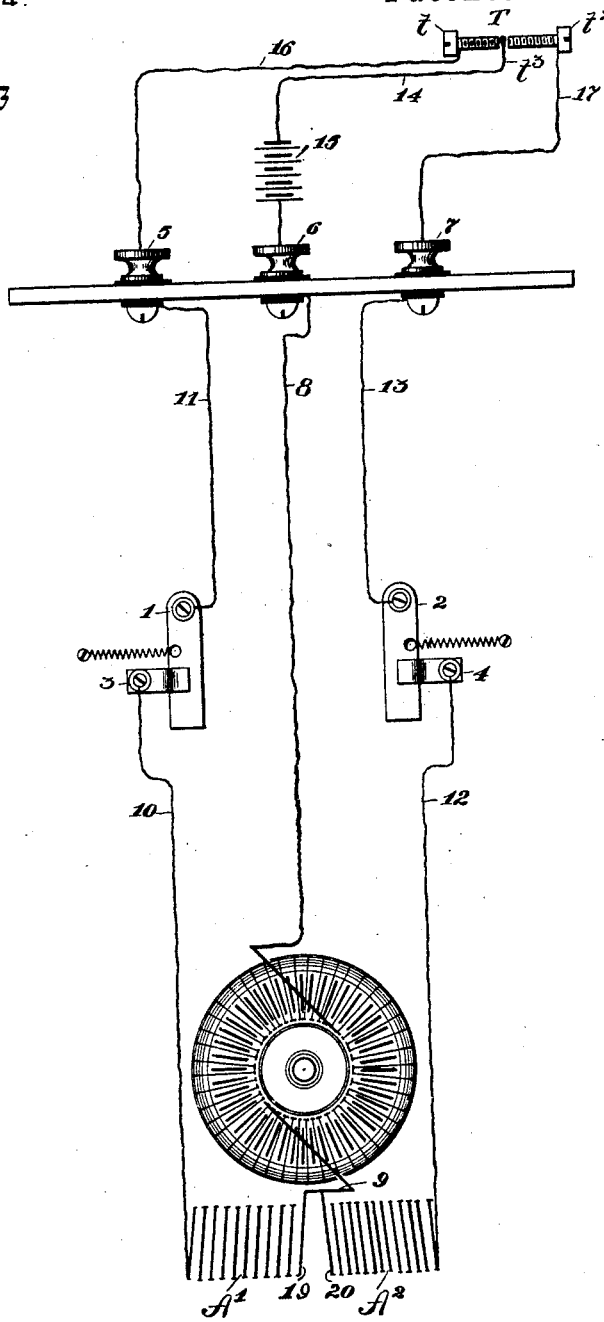
Figure 4:
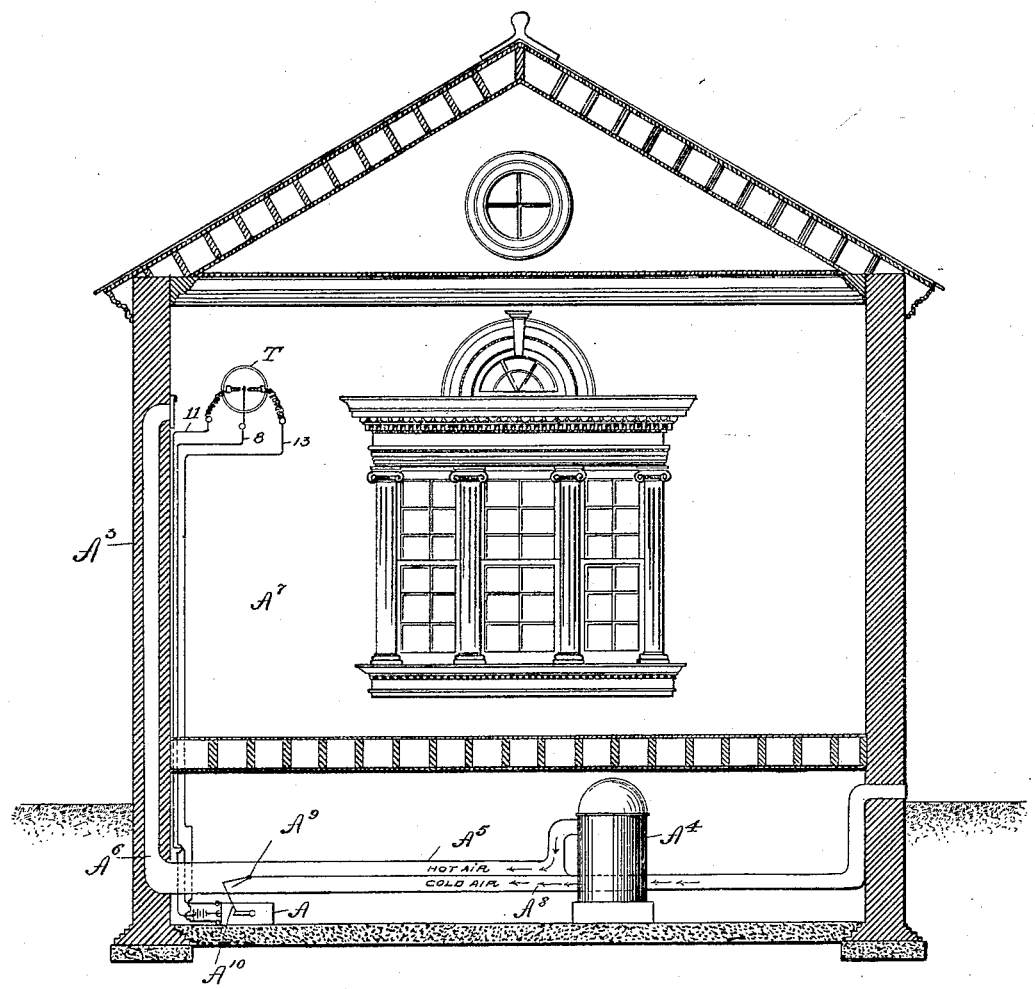

Figure 1 is a side elevation of a valve-controller made in accordance with my invention, the same being shown as inclosed within a containing-box, one side of which box has been removed in order to allow the mechanism to be seen. Fig. 2 is a plan view of the device shown in Fig. 1. Fig. 3 is a diagrammatic view of a part of the apparatus, showing the circuit connections in detail; and Fig. 4 is a section of a building, showing my improvement applied thereto.

My invention has particular reference to that class of apparatus which is designed to open and close valves in response to circuit changes produced by a thermostat, and my improvement is specially directed to producing a structure in which the movement of the valve-controller will be automatically stopped when the valve has been opened to the desired extent or completely closed, as the case may be.

In the drawings forming part hereof, A is a suitable iron box for containing the mechanism, which I use by preference in order to keep the parts covered and screened from outside interference.

B is a suitable electric motor, whose shaft $b$ is provided with a worm, as $c$, which meshes with a suitably-supported pinion, as $d$, carried upon the shaft $e$. Carried also upon the shaft $e$ is a pinion $g$, which meshes with a gear-wheel $h$, carried upon a shaft $i$, which is journaled in the containing-box or otherwise suitably supported. Carried also upon the shaft $i$ is a pinion $j$, which meshes with the gear-wheel C, upon whose shaft $k$ is mounted an arm $a$, which actuates the valve mechanism in any suitable manner.

Mounted upon the wheel C are lugs or bosses $l\ l'$, preferably of insulating material, which, as the wheel turns, will contact with the pivoted switches 1 2, respectively, as will be fully hereinafter set forth. These switches 1 2 are held against their contact-pieces 3 4, respectively, by springs $m$, so as to make a good electrical contact.

D is an oil-cup which communicates with the bearings at the points $n$, $o$, $p$, $p'$, and $p^2$ by means of the tubes $q$ and $r$, through which the oil for the bearings is conveyed.

The terminal contact binding-posts of the valve-controller are numbered 5, 6, and 7.

The circuits through the valve-controller are as follows: From the binding-post 6 a wire 8 leads to one of the brushes of the motor, and from the other brush of the motor a wire 9 leads and splits into two wires 19 20, one of which 19 leads to one section A' of the field-coil, which is compound-wound, the opposite terminal 10 of this section leading to the contact-piece 3, with which the switch 1 co-operates, which switch is connected by wire 11 with the binding-post 5. The other wire 20 leads to the section $A^2$ of the field-coil. The other terminal 12 of this field-coil section $A^2$ leads to contact-piece 4, which co-operates with the switch 2, which contact-piece connects with binding-post 7 by wire 13.

T is a thermostatic switch or other circuit manipulator having the contact-points $t\ t^2$ and the contact-arm $t^3$. The contact-arm is connected to the binding-post 6 by wire 14, in which is included a suitable battery-source of electric current 15. The contact-point $t$ connects with binding-post 5 by wire 16, and contact-point $t^2$ connects with binding-post 7 by wire 17.

Fig. 4 shows one mode of application of my invention to a building. In this figure $A^3$ is a building, having a furnace $A^4$ in the cellar thereof. From this furnace a hot-air pipe $A^5$ leads to a duct $A^6$, leading to the main room $A^7$ of the building. A cold-air pipe $A^8$ enters the side of the building and joins the duct $A^6$ at the point of entry therein of the hot-air pipe. A valve or damper $A^9$ controls by its position the relation between the amount of cold and hot air admitted into the duct $A^6$, and is connected by a link $A^{10}$ with the arm $a$ of the valve-controller A. The thermostat T is located in the room $A^7$ whose temperature is to be controlled, and the usual wires 8, 10, and 13 lead from the thermostat to the valve-controller.

The mode of operation of my device is as follows: Suppose the parts to be in the positions shown and it is desired to open the valve, the thermostatic contact points or arm are placed in such position that the valve will be automatically opened at a predetermined time or temperature, or may be normally operated. We will suppose that the thermostatic contact-arm has touched the thermostat contact-point $t$. The course of the current will be as follows: from the battery to the binding-post 6, thence by wire 8 through the armature of the motor, and thence by wires 9 and 19 through section A' of the field by wire 10, contact-piece 3, switch 1, wire 11, binding-post 5, wire 16, contact-point $t$, wire 14, back to the battery. This will produce a revolution of the motor and a revolution of the wheel C in the direction of the arrow and an adjustment of the valve by means of the rod $a$. As soon as the valve has been adjusted the boss $l$ will come in contact with the switch 1 and swing it away from its contact-piece 3, thus breaking the circuit and stopping the motor. The circuit having been broken at the switch 1, the thermostat contact-arm $t^3$ may remain against its screw $t$ indefinitely without producing any further motion of the valve-controller. When it is desired to close the valve, which has been opened as described, the thermostat contact-arm is brought against the contact-point $t^2$, and the course of the current is as follows: from the battery to binding-post 6, thence by wire 8 through the armature of the motor, thence by wires 9 and 20 through the section $A^2$ of the compound winding of the field by wire 12, contact-piece 4, switch 2, wire 13, binding-post 7, wire 17, contact-piece $t^2$, contact-arm $t^3$, wire 14, back to the battery. This will produce a revolution of the motor in a direction opposite to its revolution in the former act of operating the valve. There will be a consequent reversal of the movement of the wheel C, and after the valve has been moved to the desired extent the boss $l'$ will contact with the switch 2 and swing it away from engagement with its contact-piece 4. As soon as the circuit has been opened at the switch 2 the revolution of the motor and of its geared train of wheels will cease. It will of course be obvious that as soon as the switch 1 is relieved from the pressure of the boss $l$ the spring $m$ will restore it to its initial position, so that when the thermostat contact-arm swings over to the contact-point $t$ there will be an uninterrupted circuit for the current to traverse. By these operations the position of the valve or damper $A^9$, and consequently the hot and cold air supply to the room $A^7$, can be regulated.

What I claim, and desire to secure by Letters Patent, is—

In a thermostatic valve controlling system, the combination of the following instrumentalities, to-wit: a thermostat having a contact arm and a plurality of contact points, a motor having a single armature, a train of gear and a plurality of circuits connected with said motor, one of which circuits is completed through one of these contacts, the other circuit being completed through the other contact point, a separate pivoted switch in each circuit, a valve controlling arm actuated from the motor by the train of gears, and a gear as C forming part of the previously mentioned train of gears and provided with insulated bosses for engagement with the switches to swing the same on their pivots, whereby when the contact arm of the thermostat is in engagement with one contact point a rotation of the wheel C is had to a predetermined extent in one direction, the circuit by which said motion is accomplished being automatically broken when the predetermined extent of the motion is reached, and when the contact arm of the thermostat is in engagement with another of the contact points, a motion of the wheel C in an opposite direction is had until the predetermined extent of motion is completed when the circuit by which said motion is accomplished is automatically broken, substantially as described.

GEORGE HILL.

Witnesses:
HARRY M. TURK,
GEO. E. MOORE.